(12) United States Patent
Mattila (10) Patent No.: US 9,746,339 B2
(45) Date of Patent: Aug. 29, 2017

(54) APPARATUS, METHOD, COMPUTER PROGRAM AND USER DEVICE FOR ENABLING CONTROL OF A VEHICLE

(71) Applicant: Nokia Technologies Oy, Espoo (FI)

(72) Inventor: Ville-Veikko Mattila, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/801,785

(22) Filed: Jul. 16, 2015

(65) Prior Publication Data

US 2016/0041556 A1 Feb. 11, 2016

(30) Foreign Application Priority Data

Aug. 7, 2014 (GB) .................................. 1413983.6

(51) Int. Cl.
| | |
|---|---|
| *G01C 21/36* | (2006.01) |
| *G05D 1/02* | (2006.01) |
| *G08G 1/005* | (2006.01) |
| *G08G 1/16* | (2006.01) |
| *G05D 1/00* | (2006.01) |

(52) U.S. Cl.
CPC ....... *G01C 21/3661* (2013.01); *G05D 1/0022* (2013.01); *G08G 1/005* (2013.01); *G08G 1/163* (2013.01); *G05D 2201/0213* (2013.01)

(58) Field of Classification Search
CPC ........ G01C 21/26; G01C 21/34; G01C 21/36; G01C 21/3661; H04L 67/32; G06Q 10/047; G08G 1/096844; G08G 1/096816; G08G 1/166; G08G 1/005; G08G 1/163; G05D 1/0011; G05D 2201/0213; G05D 1/0022
See application file for complete search history.

(56) References Cited

U.S. PATENT DOCUMENTS

| | | |
|---|---|---|
| 5,774,069 A | 6/1998 | Tanaka et al. |
| 6,064,926 A | 5/2000 | Sarangapani et al. |

(Continued)

FOREIGN PATENT DOCUMENTS

| | | |
|---|---|---|
| DE | 102009035072 A1 | 2/2011 |
| EP | 2617627 A2 | 7/2013 |

OTHER PUBLICATIONS

Bilstrup et al.,"Vehicle Alert System", 14th World Congress on Intelligent Transport System, Oct. 9-13, 2007, 8 Pages.

(Continued)

*Primary Examiner* — Redhwan K Mawari
*Assistant Examiner* — Alan D Hutchinson
(74) *Attorney, Agent, or Firm* — Alston & Bird LLP (57) ABSTRACT

An apparatus, method and computer program wherein the method comprises: processing circuitry; and memory circuitry including computer program code; the memory circuitry and the computer program code configured to, with the processing circuitry, cause the apparatus at least to perform: identifying at least one user device associated with a user;

enabling information indicative of an intended path of a vehicle to be provided to the at least one identified user device; determining whether or not the apparatus has received a notification that the user has acknowledged the information indicative of the intended path of the vehicle; and if the apparatus has not received the notification, enabling modification of the intended path of the vehicle.

21 Claims, 7 Drawing Sheets

(56) References Cited

U.S. PATENT DOCUMENTS

| | | | |
|---|---|---|---|
| 7,095,336 B2 * | 8/2006 | Rodgers | G08G 1/166 340/435 |
| 7,994,902 B2 | 8/2011 | Avery et al. | |
| 8,510,029 B2 | 8/2013 | Curtis et al. | |
| 9,315,192 B1 * | 4/2016 | Zhu | B60W 30/18 |
| 2007/0293996 A1 | 12/2007 | Mori et al. | |
| 2010/0253492 A1 * | 10/2010 | Seder | G01S 13/723 340/435 |
| 2011/0090093 A1 | 4/2011 | Grimm et al. | |
| 2011/0140919 A1 | 6/2011 | Hara et al. | |
| 2011/0210866 A1 | 9/2011 | David et al. | |
| 2013/0065530 A1 * | 3/2013 | Gansen | H04L 12/66 455/41.2 |
| 2013/0235347 A1 | 9/2013 | Hennessey et al. | |
| 2014/0191884 A1 * | 7/2014 | Maeda | G08G 1/005 340/944 |
| 2014/0240444 A1 * | 8/2014 | Szymczyk | H04L 12/1827 348/14.07 |
| 2015/0134180 A1 * | 5/2015 | An | G01C 21/34 701/23 |
| 2015/0228195 A1 * | 8/2015 | Beaurepaire | G08G 1/0962 340/907 |

OTHER PUBLICATIONS

"Autonomous Vehicles", Techtalk@Kpit, vol. 6, No. 4, Oct.-Dec. 2013, 60 pages.
Search Report received for corresponding United Kingdom Patent Application No. 1413983.6, dated Jan. 23, 2015, 3 pages.

* cited by examiner

APPARATUS, METHOD, COMPUTER PROGRAM AND USER DEVICE FOR ENABLING CONTROL OF A VEHICLE

TECHNOLOGICAL FIELD

Examples of the present disclosure relate to an apparatus, method and computer program for enabling control of a vehicle. In particular, they relate to enabling control of a vehicle to enable interaction between an autonomous vehicle and people nearby the vehicle.

BACKGROUND

Apparatus and methods which enable autonomous control of vehicles, such as cars, are known. The vehicle may comprise a navigation system which may enable the intended route of the vehicle to be determined. Such vehicles may also comprise a plurality of sensors located around the vehicle which may be configured to detect objects around the vehicle to ensure that the vehicle does not collide with other objects. The vehicle may also comprise transceivers which may enable the vehicle to communicate with other vehicles and/or user devices which may be located proximate to the vehicle.

Where vehicles have autonomous capability it may be useful to reduce the likelihood of accidents which may occur if, for example, users near the vehicle are not aware of the vehicle.

BRIEF SUMMARY

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform: identifying at least one user device associated with a user; enabling information indicative of an intended path of a vehicle to be provided to the at least one identified user device; determining whether or not the apparatus has received a notification that the user has acknowledged the information indicative of the intended path of the vehicle; and if the apparatus has not received the notification, enabling modification of the intended path of the vehicle.

In some examples the apparatus may be configured to obtain information from at least one user device wherein the obtained information comprises information indicative of the paths of travel of a user associated with the at least one user device. The apparatus may be configured to use the obtained information to identify at least one user device associated with a user having a path of travel which is likely to be affected by the intended path of a vehicle. The information indicative of the intended path of the vehicle may be provided to user devices associated with users which are most likely to be affected by the intended path of the vehicle.

In some examples changing the intended path of the vehicle may comprise at least one of, reducing the speed of the vehicle, changing the direction of the vehicle, changing a lane of the vehicle.

In some examples the user device may comprise a near eye display. In some examples the information indicative of the intended path of the vehicle may be displayed on the near eye display.

In some examples the apparatus may be configured to establish a local wireless communication link between the apparatus and the user device to enable information to be exchanged between the apparatus and the user device.

In some examples information relating to the location of the user may be used to determine whether or not the vehicle is visible to the user. The information relating to the location of the user may comprise three-dimensional model information of the area around the user.

According to various, but not necessarily all, examples of the disclosure there may be provided a vehicle comprising an apparatus as described above.

According to various, but not necessarily all, examples of the disclosure there may be provided a method comprising: identifying at least one user device associated with a user; enabling information indicative of an intended path of a vehicle to be provided to the at least one identified user device; determining whether or not the apparatus has received a notification that the user has acknowledged the information indicative of the intended path of the vehicle; and if the apparatus has not received the notification, enabling modification of the intended path of the vehicle.

In some examples the method may further comprise obtaining information from at least one user device wherein the obtained information comprises information indicative of the paths of travel of a user associated with the at least one user device. In some examples the method may further comprise using the obtained information to identify at least one user device associated with a user having a path of travel which is likely to be affected by the intended path of a vehicle. In some examples the method may further comprise providing the information indicative of the intended path of the vehicle to user devices associated with users which are most likely to be affected by the intended path of the vehicle.

In some examples changing the intended path of the vehicle may comprise at least one of, reducing the speed of the vehicle, changing the direction of the vehicle, changing a lane of the vehicle.

In some examples the user device may comprise a near eye display. In some examples the information indicative of the intended path of the vehicle may be displayed on the near eye display.

In some examples the method may further comprise establishing a local wireless communication link between the apparatus and the user device to enable information to be exchanged between the apparatus and the user device.

In some examples information relating to the location of the user may be used to determine whether or not the vehicle is visible to the user. The information relating to the location of the user may comprise three-dimensional model information of the area around the user.

According to various, but not necessarily all, examples of the disclosure there may be provided a computer program comprising computer program instructions that, when executed by processing circuitry, enable: identifying at least one user device associated with a user; enabling information indicative of an intended path of a vehicle to be provided to the at least one identified user device; determining whether or not the apparatus has received a notification that the user has acknowledged the information indicative of the intended path of the vehicle; and if the apparatus has not received the notification, enabling modification of the intended path of the vehicle.

According to various, but not necessarily all, examples of the disclosure there may be provided a computer program comprising program instructions for causing a computer to perform methods as described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided a user device comprising: processing circuitry; and memory circuitry including computer program code; the memory circuitry and the computer program code configured to, with the processing circuitry, cause the user device at least to perform: receiving information indicative of the intended path of a vehicle; providing the information indicative of an intended path of a vehicle to a user; determining whether or not the user has acknowledged the information indicative of the intended path of the vehicle; and if it is determined that the user has acknowledged the information indicative of the intended path of the vehicle, transmitting a notification indicating that the user has acknowledged the information indicative of the intended path of the vehicle.

In some examples the user device may comprise a near eye display.

In some examples the information indicative of the intended path of a vehicle may be displayed in an augmented reality application.

In some examples the near eye display may be configured to track the gaze of the user to determine whether or not the user has viewed the information.

In some examples information relating to the location of the user may be used to determine whether or not the vehicle is visible to the user. In some examples the information relating to the location of the user may comprise three-dimensional model information of the area around the user.

In some examples the user device may be configured to provide information relating to vehicles which are not in view of the user.

In some examples the user device may be configured to transmit information indicative of the intended path of the user to vehicles within a predefined proximity of the user device.

In some examples the user device may be configured to establish a local wireless communication link between the apparatus and the user device to enable information to be exchanged between the apparatus and the user device.

According to various, but not necessarily all, examples of the disclosure there may be provided a method comprising: receiving information indicative of the intended path of a vehicle; providing the information indicative of an intended path of a vehicle to a user; determining whether or not the user has acknowledged the information indicative of the intended path of the vehicle; and if it is determined that the user has acknowledged the information indicative of the intended path of the vehicle, transmitting a notification indicating that the user has acknowledged the information indicative of the intended path of the vehicle.

In some examples the information may be received by a user device comprising a near eye display.

In some examples the information indicative of the intended path of a vehicle may be displayed in an augmented reality application.

In some examples the near eye display may be configured to track the gaze of the user to determine whether or not the user has viewed the information.

In some examples information relating to the location of the user may be used to determine whether or not the vehicle is visible to the user. The information relating to the location of the user may comprise three-dimensional model information of the area around the user.

In some examples the method may further comprise providing information relating to vehicles which are not in view of the user.

In some examples the method may further comprise transmitting information indicative of the intended path of the user to vehicles within a predefined proximity of the user device.

In some examples the method may further comprise establishing a local wireless communication link between the apparatus and the user device to enable information to be exchanged between the apparatus and the user device.

According to various, but not necessarily all, examples of the disclosure there may be provided a computer program comprising computer program instructions that, when executed by processing circuitry, enable: receiving information indicative of an intended path of a vehicle; providing the information indicative of the intended path of a vehicle to a user; determining whether or not the user has acknowledged the information indicative of the intended path of the vehicle; and if it is determined that the user has acknowledged the information indicative of the intended path of the vehicle, transmitting a notification indicating that the user has acknowledged the information indicative of the intended path of the vehicle.

According to various, but not necessarily all, examples of the disclosure there may be provided a computer program comprising program instructions for causing a computer to perform methods as described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

According to examples of the disclosure there may be provided an apparatus 1 comprising: processing circuitry 5; and memory circuitry 7 including computer program code 11; the memory circuitry 7 and the computer program code 11 configured to, with the processing circuitry 5, cause the apparatus 1 at least to perform: identifying at least one user device 31 associated with a user; enabling information indicative of an intended path of a vehicle 21 to be provided to the at least one identified user device 31; determining whether or not the apparatus 1 has received a notification that the user has acknowledged the information indicative of the intended path of the vehicle 21; and if the apparatus 1 has not received the notification, enabling modification of the intended path of the vehicle 21.

The apparatus 1 may be for enabling control of a vehicle 21. The apparatus 1 may be for enabling control of an autonomous vehicle 21.

According to examples of the disclosure there may be provided a user device 31 comprising: processing circuitry 5; and memory circuitry 7 including computer program code 11; the memory circuitry 7 and the computer program code 11 configured to, with the processing circuitry 5, cause the user device 31 at least to perform: receiving information indicative of the intended path of a vehicle 21; providing the information indicative of the intended path of a vehicle 21 to a user; determining whether or not the user has acknowledged the information indicative of the intended path of the vehicle 21; if it is determined that the user has acknowledged the information indicative of the intended path of the vehicle 21, transmitting a notification indicating that the user has acknowledged the information indicative of the intended path of the vehicle 21.

The user device 31 may be for providing information to a user. The user device 31 may comprise a wireless communications device.

Examples of the disclosure provide a system for enabling a vehicle 21 with autonomous capability to interact with people in the area around the vehicle 21. The people may be pedestrians or cyclists or any other suitable people. This may reduce the probability of an accident occurring.

Figure 1:
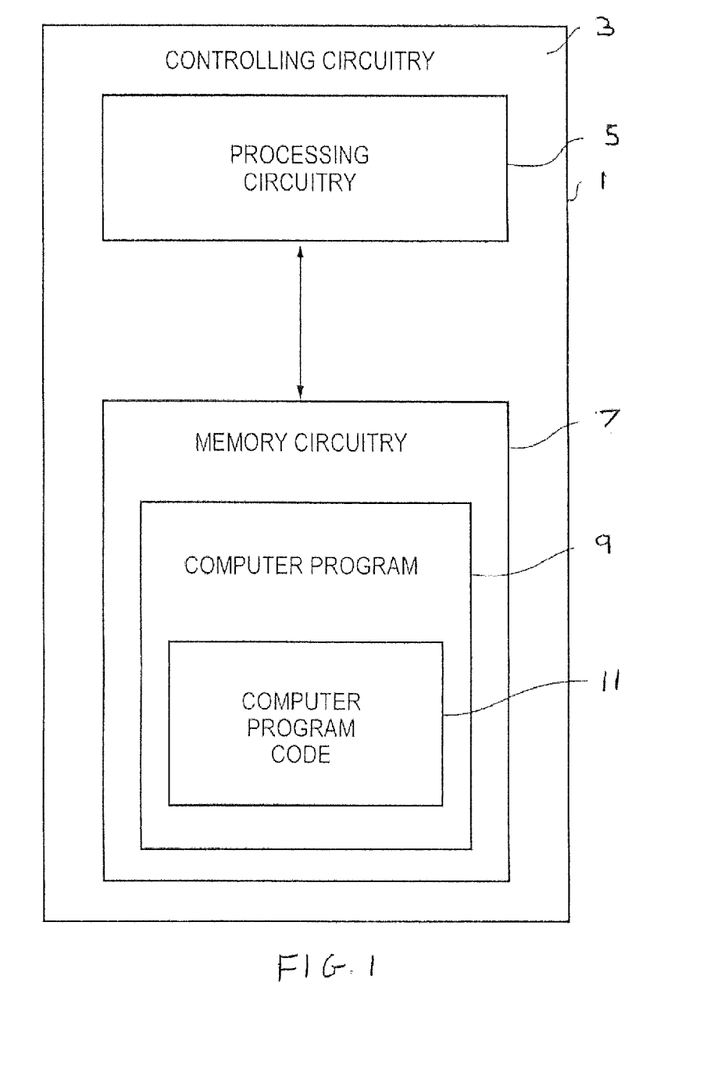
FIG. 1 illustrates an apparatus.

FIG. 1 schematically illustrates an example apparatus 1 which may be used in implementations of the disclosure. The apparatus 1 illustrated in FIG. 1 may be a chip or a chip-set. The apparatus 1 may be provided within a device such as a vehicle 21. In some examples an apparatus 1 such as a chip or chip-set may be provided within a user device 31.

The example apparatus 1 comprises controlling circuitry 3. Where the apparatus 1 is provided in a vehicle 21 the controlling circuitry 3 may provide means for enabling autonomous control of the vehicle 21. The autonomous control of a vehicle 21 may be location based. The autonomous control of the vehicle 21 may enable the vehicle to follow an intended path of travel without direct control inputs from a user. The intended path may comprise a route from a first point to second point. The intended path may also comprise the speeds at which the vehicle 21 intends to travel, the lanes in which the vehicle intends to travel, which junctions and intersections the vehicle 21 will turn at or any other suitable information.

Where the apparatus 1 is provided in a user device 31 the controlling circuitry 3 may provide means for enabling information to be provided to a user. The user device 31 may be configured to enable a user to view information which may be received by the user device 31.

The controlling circuitry 3 may comprise one or more controllers. The controlling circuitry 3 may be implemented using instructions that enable hardware functionality, for example, by using executable computer program instructions in a general-purpose or special-purpose processing circuitry 5 that may be stored on a computer readable storage medium (disk, memory etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enables the apparatus 1 to perform the example methods illustrated in FIGS. 5 to 7. The processing circuitry 5 by reading the memory circuitry 7 is able to load and execute the computer program 9.

The apparatus 1 therefore comprises: processing circuitry 5; and memory circuitry 7 including computer program code 11; the memory circuitry 7 and the computer program code 11 configured to, with the processing circuitry 5, cause the apparatus 1 at least to perform: identifying at least one user device 31 associated with a user; enabling information indicative of the intended path of a vehicle 21 to be provided to the at least one identified user device 31; determining whether or not the apparatus 1 has received a notification that the user has acknowledged the information indicative of the intended path of the vehicle 21; and if the apparatus 1 has not received the notification, enabling modification of the intended path of the vehicle 21.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 9. The apparatus may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 2:
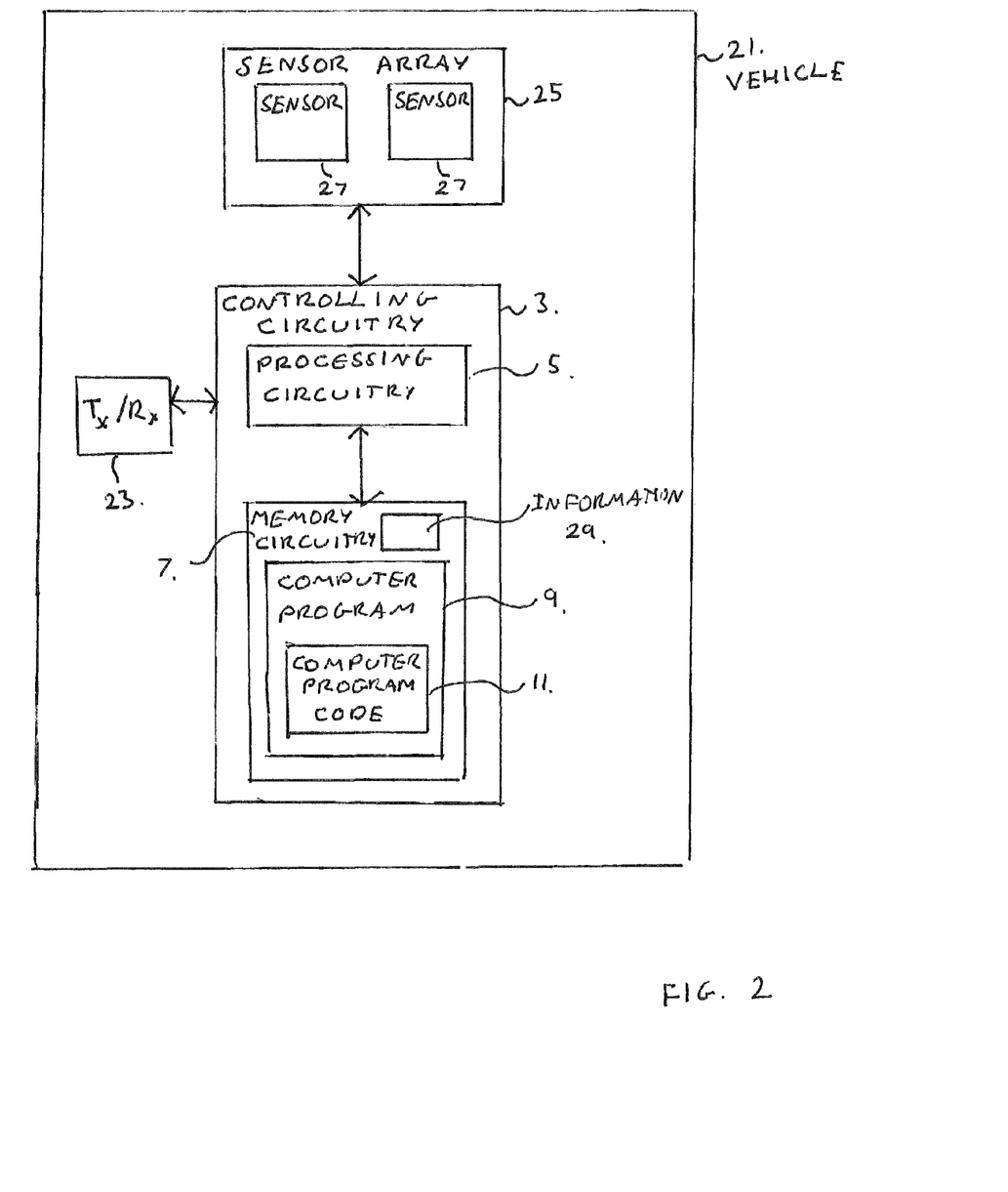
FIG. 2 illustrates a vehicle.

FIG. 2 schematically illustrates an example vehicle 21. The vehicle 21 may comprise a car, van or any other suitable type of vehicle.

The example vehicle 21 of FIG. 2 comprises an apparatus 1 as described above in relation to FIG. 1, a transceiver 23 and a sensor array 25. The vehicle 21 may be configured with autonomous capability which may enable the vehicle 21 to travel along an intended path without direct control from a user. It is to be appreciated that only features necessary for the following description have been illustrated in FIG. 2. Other example vehicles 21 may comprise additional features.

The transceiver 23 may comprise one or more transmitters and/or receivers. The transceiver 23 may comprise any means which enables the apparatus 1 to establish a communication connection with a remote device and exchange information with the remote device. The remote devices may comprise one or more user devices 31. The communication connection may comprise a wireless connection.

In some examples the transceiver 23 may enable the apparatus 1 to establish a local wireless communication link between the apparatus 1 and one or more user devices. The local wireless communication link may enable information to be exchanged between the apparatus 1 and the user device. The local wireless communication link may have a range in the order of tens of meters. This may enable the apparatus 1 to exchange information with user devices which are located nearby the vehicle 21. In some examples this may enable the apparatus 1 to exchange information with user devices which are located within several meters or within tens of meters of the vehicle 21.

In some examples the transceiver 23 may be configured to enable the apparatus 1 to connect to a network such as a cellular network. In some examples the transceiver 23 may be configured to enable the apparatus 1 to communicate within a navigation system such as a global positioning system (GPS). The GPS system may enable the position of the vehicle 21 to be determined and may enable an intended path for the vehicle 21 to be defined.

The sensor array 25 may comprise a plurality of sensors 27. The plurality of sensors 27 may comprise any means which may be configured to detect a physical parameter relating to the vehicle 21 and provide an electrical signal indicative of the physical parameter. In some examples one or more of the sensors 27 may be configured to detect the distance between the vehicle 21 and other objects. The information obtained from such sensors may be used to determine and/or modify the intended path of the vehicle 21 to prevent the vehicle 21 from colliding with other objects.

The sensor array 25 may be configured to provide the information obtained from the sensors 27 to the controlling circuitry 3. The controlling circuitry 3 may store the obtained information in the memory circuitry 7 and/or use the information to enable autonomous control of a vehicle.

In the example vehicle 21 of FIG. 2 the memory circuitry 7 is configured to store information 29. The information 29 may comprises information 29 relating to the intended path of the vehicle 21. In some examples the information may comprise information obtained from a maps or navigation application which may enable the intended path of the vehicle 21 to be determined and/or modified. In some examples the information 29 may comprise information relating three dimensional models of the area through which the vehicle 21 is intending to travel. The three dimensional model information may enable the vehicle 21 to determine whether or not a person's view of the vehicle 21 is obstructed.

Figure 3:
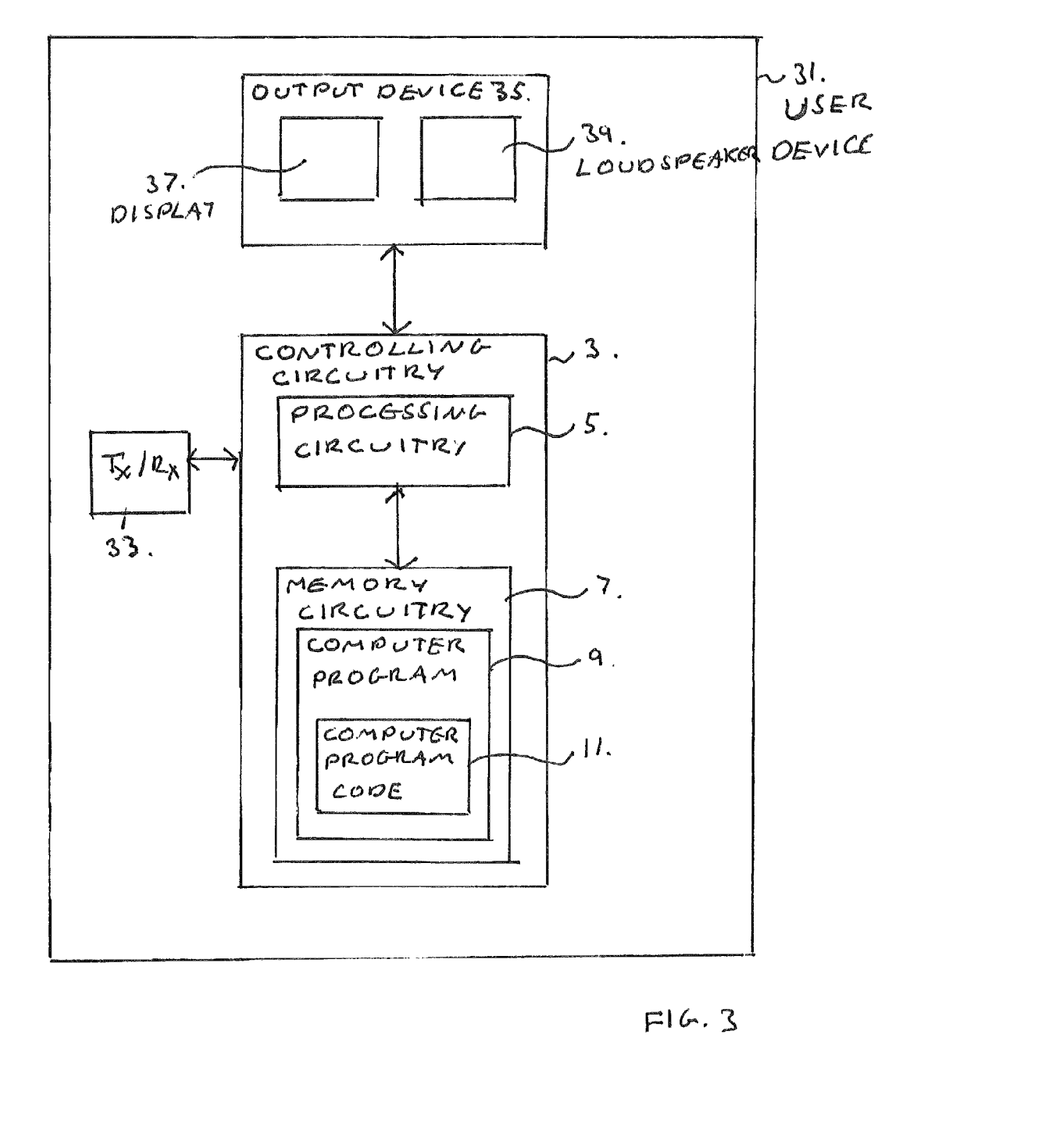
FIG. 3 illustrates a user device.

FIG. 3 schematically illustrates an example user device 31. The user device 31 may also comprise an apparatus 1 as described above in relation to FIG. 1. The user device 31 may also comprise a transceiver 33 and an output device 35. It is to be appreciated that only features necessary for the following description have been illustrated in FIG. 3. Other example user device 31 may comprise additional features.

The user device 31 may comprise any device which may be associated with a user. The user device may comprise a portable device which may be carried or worn by the user during use. In some examples the user device 31 may comprise a head set which may enable the user device 31 to be mounted on the head of the user. Such devices may be used to implement augmented reality applications or for any other suitable purpose.

The user device 31 may be associated with a user. For example, if the user device 31 is being carried or worn by the user then the position of the user device 31 corresponds to the position of the user. The user device 31 may be configured to detect and/or obtain information relating to the activity of the user which is associated with the user device 31. For example the user device 31 may be configured to determine which way the user is looking or where the user is travelling or any other suitable information.

The transceiver 33 may comprise one or more transmitters and/or receivers. The transceiver 33 may comprise any means which enables the user device 31 to establish a communication connection with a remote device and exchange information with the remote device. The remote devices may comprise one or more vehicles 21 such as the example vehicle of FIG. 2. The communication connection may comprise a wireless connection.

In some examples the transceiver 33 may enable the apparatus 1 to establish a local wireless communication link between an apparatus 1 within a vehicle 21. The communication link may enable information to be exchanged between the apparatus 1 and the user device 31. The communication link may have a range in the order of tens of meters. This may enable the user device 31 to exchange information with apparatus 1 within vehicles 21 which are located nearby the user device 31. This may enable the user device 31 to exchange information with vehicles 21 which are located within several meters or within tens of meters of the user device 31.

The output device 35 may comprise any means which may be configured to provide an output to a user. The output may comprise information which is stored in the memory circuitry and/or information which has been received via the transceiver 33.

In the example of FIG. 3 the output device comprises a display 37 and a loudspeaker 39. It is to be appreciated that other output devices and/or combinations of output devices may be provided in other examples of the disclosure.

The display 37 may comprise any means which may be configured to display information to a user. In some examples the display 37 may comprise a near eye display. The near eye display may be configured to enable an image to be provided proximate to an eye of the user. The near eye display may be configured to provide a user with images which enable the user to use virtual reality or augmented reality applications. The near eye display may be configured so as to enable overlaid viewing of virtual content and the real world.

A user device 31 comprising a near eye display may be configured to be worn by the user. For example the user device 31 may comprise a mounting portion such as a head piece. The mounting portion may enable the near eye display to be mounted on the head or face of the user. When the near eye display is mounted on the head or face of the user, the user's head or face may support the weight or at least a portion of the weight of the near eye display.

The loudspeaker 39 may comprise any means which may be configured to provide an audio output. In some examples the loudspeaker 39 may be provided in an ear piece which may be configured to be located adjacent to or within a user's ear.

In some examples the user device 31 may comprise means for enabling a user to acknowledge information. For instance, in examples where the user device 31 comprises a near eye display the user device 31 may be configured to monitor the position of the user's pupil to determine the direction in which the user is looking. This may enable the user device 31 to determine whether or not the user has seen the information displayed on the display. This may enable the user to acknowledge the information without making any specific input. In some examples the user device 31 may enable the user to make a specific input to indicate that that they have acknowledged the information.

In the example of FIG. 3 the user device 31 is illustrated as a single component. It is to be appreciated that in other examples the user device 31 may comprise a plurality of different components. For example the user device 31 could comprise a portable device such as a mobile phone which may be configured to communicate with a headset via a low power wireless connection. In such examples the headset may comprise one or more output devices, and the mobile phone may comprise the controlling circuitry 3.

Figure 4:
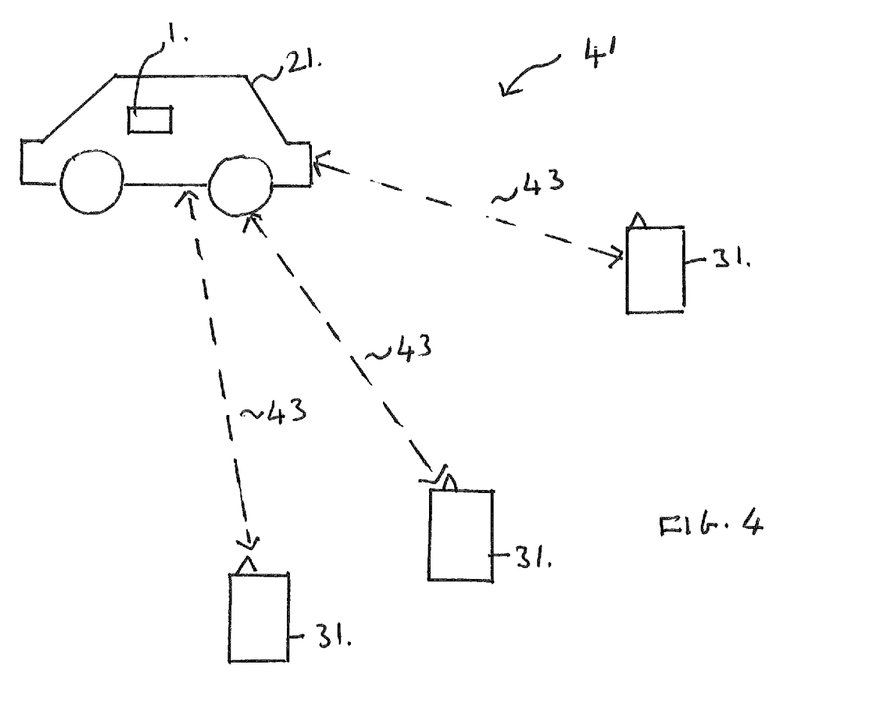
FIG. 4 illustrates a system comprising a vehicle and a user device.

FIG. 4 illustrates an example system 41 comprising a vehicle 21 and one or more user devices 31 according to examples of the disclosure. The vehicle 21 may be as described above in relation to FIG. 2. The user devices 31 may be as described above in relation to FIG. 3. Corresponding reference numerals are used for corresponding features.

In the example of FIG. 4 the system comprises three user devices 31. It is to be appreciated that any number of user device 31 may be provided in other example systems 41.

The user devices 31 may be associated with users who are positioned close to the vehicle 21. The users may comprise pedestrians, cyclist or any other people who may be located near the vehicle 21. The users associated with the user devices 31 may be stationary or moving.

The user devices 31 may be within a range of several meters or tens of meters of the vehicle 21. The user devices 31 may be located within a predetermined distance of the vehicle 21. The predetermined distance may be determined by factors such as the speed at which the vehicle 21 is travelling, whether or not the user's view of the vehicle is obstructed or any other suitable factors.

The apparatus 1 within the vehicle 21 may be configured to establish communication links 43 with the user devices 31. The communication links 43 may comprise local wireless communication links. The wireless communication links 43 may enable information to be exchanged directly between the user device 31 and the apparatus 1 within the vehicle 21. In the particular example of FIG. 4 there are no intermediate nodes between the apparatus 1 and the user device 31. The predetermined distance may be determined by the range of the communication links 43.

The information which is exchanged between the vehicle 21 and the user devices 31 may comprise information 29 relating to the intended path of the vehicle 21. For example, the vehicles 21 may provide information 29 indicating whether or not the vehicle 21 is intending to stop at a crossing or if the vehicle 21 is intending to make a turn. The information which is provided from the user device 31 to the apparatus 1 within the vehicle 21 may comprise a notification that the user has acknowledged the information indicative of the intended path of the vehicle 21.

Figure 5:
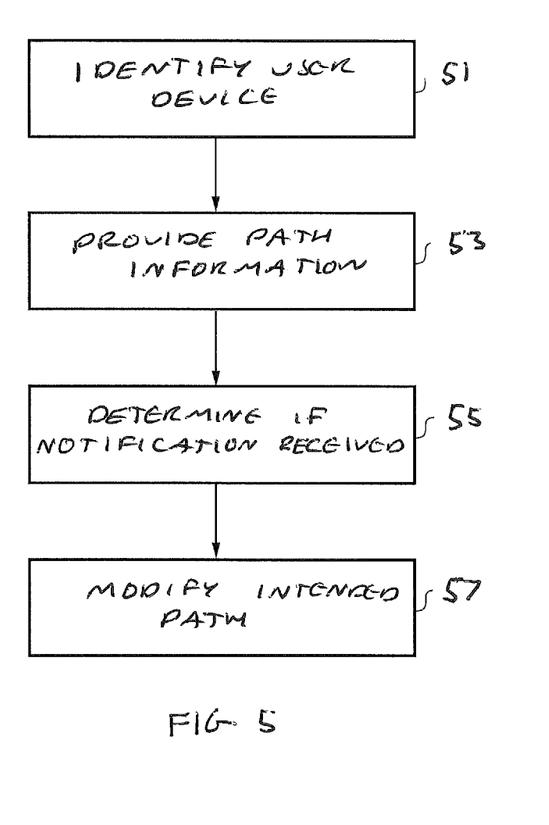
FIG. 5 illustrates a method.

FIG. 5 illustrates a method. The example method of FIG. 5 may be performed by an apparatus 1 which may be provided within a vehicle 21 as described above. The method comprises, at block 51 identifying at least one user device 31 associated with a user. At block 53 the method comprises enabling information 29 indicative of an intended path of a vehicle 21 to be provided to the at least one identified user device 31. At block 55 the method comprises determining whether or not the apparatus 1 has received a notification that the user has acknowledged the information indicative of the intended path of the vehicle 21. If the apparatus 1 has not received a notification then at block 57 the method comprises enabling modification of the intended path of the vehicle 21.

Figure 6:
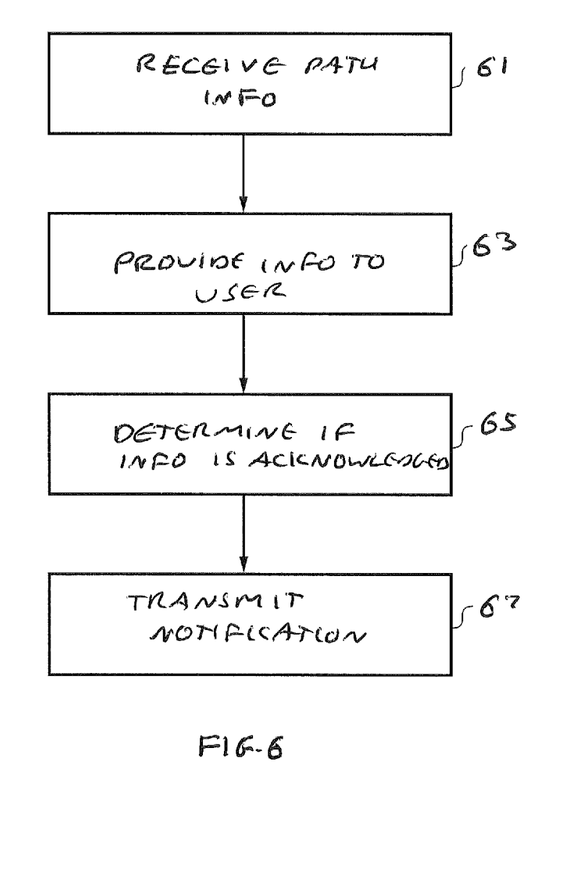
FIG. 6 illustrates a method.

FIG. 6 illustrates a method. The example method of FIG. 6 may be performed by a user device 31 as described above. The method comprises at block 61 receiving information indicative of the intended path of a vehicle 21. The method also comprises, at block 63, providing the information indicative of the intended path of a vehicle 21 to a user. At block 65 the method comprises determining whether or not the user has acknowledged the information indicative of the intended path of the vehicle 21. If it is determined that the user has acknowledged the information, then at block 67, the method comprises transmitting a notification indicating that the user has acknowledged the information indicative of the intended path of the vehicle 21.

Figure 7:
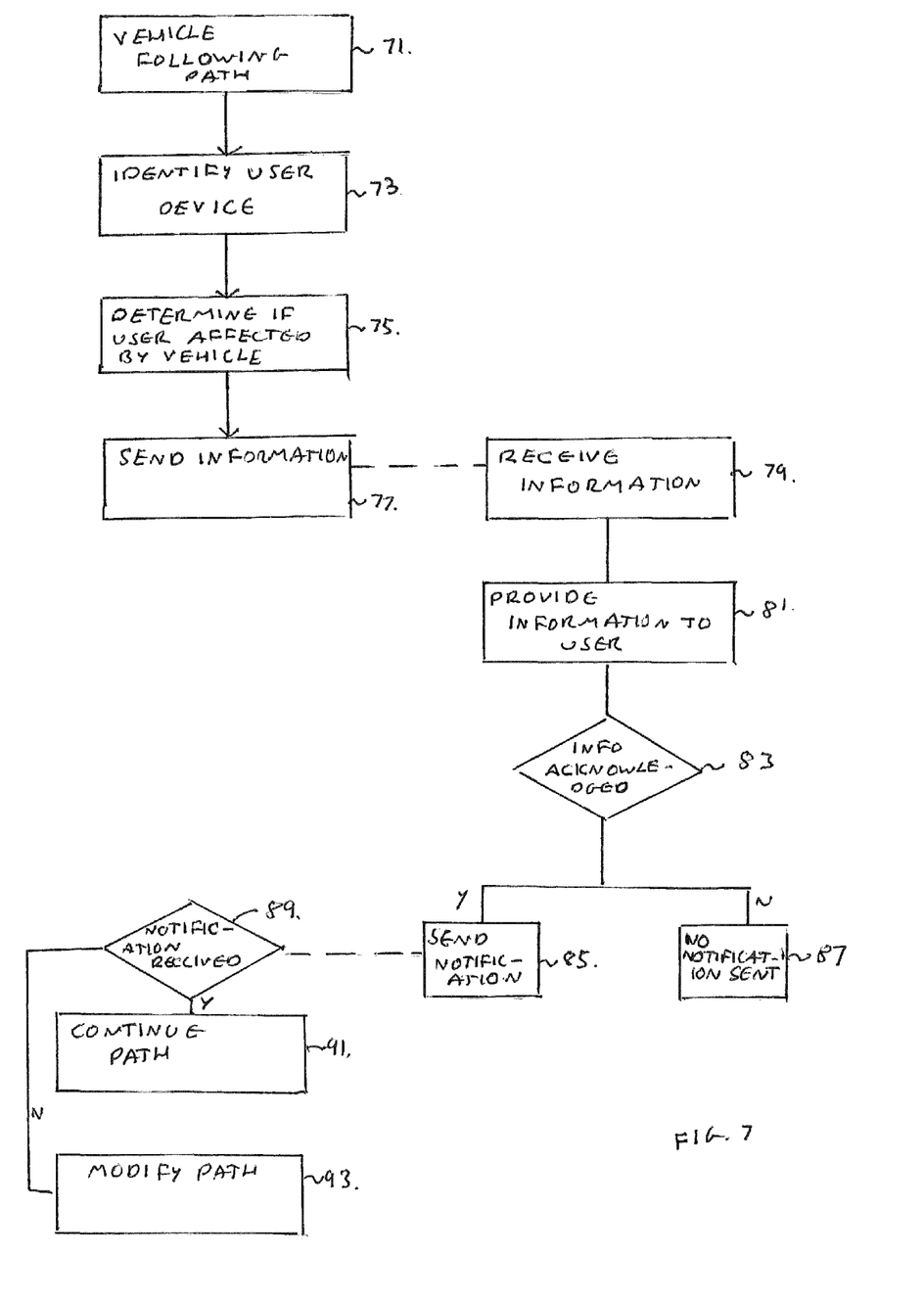
FIG. 7 illustrates a method.

FIG. 7 illustrates a method. The example method of FIG. 7 may be performed by a system 41 as described above. The system 41 may comprise at least one vehicle 21 and one or more user devices 31 which may be as described above. In the example of FIG. 7 blocks 71 to 77 and 89 to 93 may be performed by a vehicle. Blocks 79 to 87 may be performed by a user device 31.

At block 71 the vehicle 21 is following an intended path. The vehicle 21 may be controlled by the apparatus 1 so that the vehicle 21 is autonomously controlled.

Information 29 relating to the intended path of the vehicle 21 may be stored in the memory circuitry of the apparatus 1. The information may comprise information relating to a route between the current position of the vehicle 21 and a destination location. The information 29 may comprise information relating to hazards along the route. The hazards may comprise pedestrian crossings, junctions, intersections or any other possible hazards.

In some examples the information 29 may comprise three dimensional model information relating to the area through which the vehicle 21 is intending to travel. The three dimensional model information may be used to determine when a user's view of the vehicle 21 is obstructed.

At block 73 one or more user devices 31 are identified. The user devices 31 may be identified by the apparatus 1 within the vehicle 21. The user devices 73 may be associated with users who are located near the vehicle 21. The users may be pedestrians, cyclists or any other people who may be located near the vehicle 21.

In some examples the apparatus 1 may be configured to identify user devices 31 within a predetermined range of the vehicle 21. This may ensure that only user devices 31 associated with users who are likely to be affected by the intended path of the vehicle 31 are identified. The predetermined range may be determined by factors such as the speed at which the vehicle is travelling, the number of user devices 31 within the area near the vehicle, the visibility conditions, the range of the communication links 43 or any other suitable factors.

The user devices 31 may be identified by any suitable means. In some examples the apparatus 1 may periodically transmit query messages and the user devices 31 which are located nearby the vehicle 21 may provide identification information in response. This may enable a communication link 43 to be established to enable information to be exchanged between the user device 31 and the vehicle 21. It is to be appreciated that other means may be used in other examples of the disclosure.

At block 75 it is determined whether or not the user associated with the user device 31 is likely to be affected by the intended path of the vehicle 21. In some examples it may be determined whether or not the user associated with the user device 31 has a path of travel which is likely to be affected by the intended path of the vehicle 21.

The apparatus 1 may use information obtained from the user device 31 to determine whether or not the user is likely to be affected by the intended path of the vehicle 21. The information may comprise information relating to the paths of travel of the user. This information may be obtained by monitoring the direction of movement of the user device 31 and/or the direction in which the user is looking. In some examples this information may be obtained from a map or navigation application which may be implemented on the user device 31. In some examples the information obtained from the user devices 31 may include the current location of the user. For example it may include whether or not the user is located close to the edge of a sidewalk.

In some examples the apparatus 1 may use information relating to the area though which the vehicle is travelling to determine whether or not the user is likely to be affected by the intended path of the vehicle 21. The information may be obtained from a map application or other suitable application. For example the apparatus may obtain information indicating whether or not the vehicle 21 is approaching a pedestrian crossing. In some examples the information may comprise information relating to the location of bus stops or other public transport stops. If a user is stationary at a bus stop it may be assumed that they are waiting for a bus and may be unlikely to be affected by the intended path of the vehicle 21. If a user is stationary at a location which is not a bus stop then the user may be waiting to cross the road and may be likely to be affected by the intended path of the vehicle 21.

In some examples the information may comprise three dimensional model information of the area in which the user and/or the vehicle 21 is located. This may enable the apparatus 1 to determine whether or not the user's view of the vehicle 21 is obstructed.

In some examples the information may comprise other information which may increase the potential hazards to the users. For example the information may include information relating to the local weather which may be used to determine the visibility conditions around the user. For example if it is foggy or raining heavily the visibility conditions may be reduced.

If it is determined that the user associated with the user device 31 is likely to be affected by the intended path of the vehicle 21 then at block 77 the apparatus 1 sends information 29 indicative of the intended path of the vehicle 21 to the user device 31. The information 29 may be transmitted over the short range wireless communication link 43. Where there are a plurality of user devices 31 located near the vehicle 21 the apparatus 1 may identify the user devices 31 which are most likely to be affected by the intended path of the vehicle 21 and may only send the information 29 to those user devices 31. In other examples the apparatus 1 may send the information 29 to all of the user devices 31.

At block 79 the user device 31 receives the information indicative of the intended path of the vehicle 21. The information may be stored in memory circuitry 7 of the user device 31.

At block 81 the information 29 is provided to the user. The information may be provided to the user using the output device 35. The information may comprise information which may be part of the intended path of the vehicle 21. For example the information which is provided to the user may comprise an indication as to whether or not the vehicle 21 is intending to stop for a pedestrian crossing or whether the vehicle 21 is intending to turn or make any other manoeuvre or any other suitable information.

In some examples the information may be displayed on a display 37. In some examples the information may be displayed on a near eye display. The information may be provided on a display as augmented reality information. In such examples the information may be displayed so that the user views the information overlaying or adjacent to the real world vehicle 21.

It is to be appreciated that any other suitable means of providing the information to the user may be provided instead of or in addition to the information display on the display 37. For instance the loudspeaker 35 may be used to provide an audio output indicative of the intended path of the vehicle 21.

At block 83 the user device 31 determines whether or not the user has acknowledged the information which has been provided. Any suitable means may be used to determine whether or not the user has acknowledged the information.

Where the information is displayed on a display 37 the user device 31 may monitor the gaze of the user to determine whether the user has looked at the information. If the user has looked at the information then it may be determined that the user has acknowledged the information. This may enable the user to acknowledge the information without making a specific input. If the user has not looked at the information then it may be determined that the user has not acknowledged the information.

In other examples the user device 31 may be configured to enable a user to make a specific user input to indicate that they have acknowledged the information. For example it may require the user to make a specific gesture which may be detected by the user device or to manually actuate a user input device of the user device 31.

If, at block 83, it is determined that the user has acknowledged the information then, at block 85, the user input device 31 sends a notification to the vehicle 21. The notification may provide an indication that the user has acknowledged the information.

If, at block 83, it is determined that the user has not acknowledged the information then, at block 87, the user input device 31 does not send a notification to the vehicle 21. In other examples a notification may be sent at block 87. In such examples the notification may provide an indication that the user has not acknowledged the information.

At block 89 the apparatus 1 within the vehicle 21 determines whether or not a notification has been received. If the notification has been received then at block 91 the vehicle 21 continues with the intended path. The vehicle 21 may continue with the intended path as it has been confirmed that the users near the vehicle are aware of the vehicles intended path.

If the notification has not been received then at block 93 the vehicle 21 modifies the intended path of the vehicle. The modification of the intended path may comprise any one or more of, reducing the speed of the vehicle, changing the direction of the vehicle, changing a lane of a vehicle or any other suitable alterations. This may enable the vehicle 21 to reduce the risk of an accident as there may be users who are unaware of the vehicle 21.

If the vehicle 21 has provided information 29 to a plurality of user devices 31 than at block 89 the apparatus 1 may determine whether or not a notification that the user has acknowledged the information has been received from all of the user devices 31. The method may only proceed to step 91 if the notification has been received from all of the user devices 31. If the notification is received from some of the devices but not from others then the method ma proceed to block 93 and the intended path may be modified as necessary.

In some examples if the notification has not been received then the vehicle 21 may provide additional information to the user device 31 to try to draw the attention of the user to the vehicle 21. For example, it may enable the information which is displayed on the display to be more prominent or may increase the volume of an audio output.

In some examples if the notification has not been received then the vehicle 21 may also send information to other vehicles 21 which may be travelling close to the vehicle. For example, if the vehicle 21 reduces its speed it may provide a notification to vehicles travelling behind that the speed is being reduced and the rate at which the speed is being reduced.

In some examples the vehicle 21 may be configured to exchange other information with the nearby vehicles. For instance, the vehicle 21 may exchange information indicating the status of communication with a user device 31. If a first vehicle 21 has not obtained a response from a user device 31 then a second vehicle could be informed of this so that the second vehicle can try to obtain a notification.

Alternatively if a first vehicle 21 has obtained a notification from a user device 31 which indicates that a user is aware of the vehicle then the first vehicle may provide this information to other vehicles which may be travelling behind the vehicle 21. This may avoid the need for the other vehicles to contact the user devices 31.

Examples of the disclosure as described above provide a system which enables autonomous vehicles 21 to interact with user devices 31 which may be located close to the vehicle 21. This enables the vehicles to determine whether or not the users around the vehicle 21 are aware of the vehicle 21 and, if necessary, enables the vehicle 21 to take action to reduce the risk of an accident.

In the examples described above the vehicles 21 may be configured to communicate directly with the user devices 31. This may enable the information to be exchanged quickly. This may be beneficial in the examples described above because it may give the vehicle 21 more time to make any necessary adjustments to the intended path of travel.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   processing circuitry; and
   memory circuitry including computer program code;
   the memory circuitry and the computer program code configured to, with the processing circuitry, cause the apparatus at least to perform:
   identifying at least one user device remote from a vehicle, and associated with a user;
   causing information indicative of an intended path of the vehicle, accessed on the memory circuitry, to be provided to the at least one identified user device;
   determining whether the apparatus has received a notification that the user has acknowledged via a user interface of the at least one user device the information indicative of the intended path of the vehicle; and
   if the apparatus has not received the notification, causing modification on the memory circuitry of the intended path of the vehicle.

2. An apparatus of claim 1 wherein the apparatus is configured to obtain information from the at least one user device wherein the obtained information is indicative of paths of travel of the user associated with the at least one user device.

3. An apparatus of claim 2 wherein the apparatus is configured to use the obtained information to determine that the user is likely to be affected by the intended path of a vehicle.

4. An apparatus of claim 3 wherein the information indicative of the intended path of the vehicle is provided to user devices associated with users which are most likely to be affected by the intended path of the vehicle.

5. An apparatus of claim 1 wherein the causing modification of the intended path of the vehicle comprises at least one of, reducing a speed of the vehicle, changing a direction of the vehicle, or changing a lane of the vehicle.

6. An apparatus of claim 1 wherein the user device comprises a near eye display, configured to monitor a position of the user's pupil to determine a direction in which the user is looking.

7. An apparatus of claim 6 wherein the information indicative of the intended path of the vehicle is displayed on the near eye display.

8. An apparatus of claim 1 wherein the apparatus is configured to establish a local wireless communication link between the apparatus and the user device to cause the information indicative of an intended path of a vehicle to be exchanged between the apparatus and the user device.

9. An apparatus of claim 1 wherein the memory circuitry and the computer program code are further configured to, with the processing circuitry cause the information to at least determine whether the vehicle is visible to the user.

10. A method comprising:
    identifying at least one user device, remote from a vehicle, and associated with a user;
    causing information indicative of an intended path of the vehicle, accessed on memory circuitry, to be provided to the at least one identified user device;
    with processing circuitry, determining whether a notification has been received indicating that the user has acknowledged via a user interface of the at least one user device the information indicative of the intended path of the vehicle; and
    if the notification has not been received, causing modification on the memory circuitry of the intended path of the vehicle.

11. A method of claim 10 further comprising obtaining information from the at least one user device wherein the obtained information is indicative of paths of travel of the user associated with the at least one user device.

12. A method of claim 11 further comprising using the obtained information to determine that the user is likely to be affected by the intended path of a vehicle.

13. A method of claim 12 further comprising providing the information indicative of the intended path of the vehicle to user devices associated with users which are most likely to be affected by the intended path of the vehicle.

14. A method of claim 10 wherein causing modification of the intended path of the vehicle comprises at least one of, reducing a speed of the vehicle, changing a direction of the vehicle, or changing a lane of the vehicle.

15. A method of claim 10 wherein the user device comprises a near eye display, configured to monitor a position of the user's pupil to determine a direction in which the user is looking.

16. A method of claim 15 wherein the information indicative of the intended path of the vehicle is displayed on the near eye display.

17. A method of claim 10 further comprising establishing a local wireless communication link between the apparatus and the user device to cause the information indicative of an intended path of a vehicle to be exchanged between the apparatus and the user device.

18. A method of claim 10 wherein the method further comprises determining whether the vehicle is visible to the user.

19. A method of claim 18, wherein determining whether the vehicle is visible to the user is based on three-dimensional model information of an area around the user.

20. A user device remote from a vehicle the user device comprising:
    processing circuitry; and
    memory circuitry including computer program code;
    the memory circuitry and the computer program code configured to, with the processing circuitry, cause the user device at least to perform:
    receiving information indicative of an intended path of the vehicle;
    providing the information indicative of the intended path of a vehicle to a user;
    determining whether the user has acknowledged via a user interface of the user device, the information indicative of the intended path of the vehicle; and
    if it is determined that the user has acknowledged the information indicative of the intended path of the vehicle, transmitting a notification indicating that the user has acknowledged the information indicative of the intended path of the vehicle.

21. A method comprising:
    receiving information indicative of an intended path of a vehicle;
    providing the information indicative of the intended path of a vehicle to a user, via a user interface of a user device remote from the vehicle;
    determining whether the user has acknowledged via the user interface of the user device the information indicative of the intended path of the vehicle; and
    if it is determined that the user has acknowledged the information indicative of the intended path of the vehicle, transmitting a notification indicating that the user has acknowledged the information indicative of the intended path of the vehicle.

* * * * *

UNITED STATES PATENT AND TRADEMARK OFFICE
CERTIFICATE OF CORRECTION

PATENT NO. : 9,746,339 B2  
APPLICATION NO. : 14/801785  
DATED : August 29, 2017  
INVENTOR(S) : Ville-Veikko Mattila Page 1 of 1

It is certified that error appears in the above-identified patent and that said Letters Patent is hereby corrected as shown below:

In the Drawings

Sheet 7 of 7, FIG. 7, Box "89", Line 3, "RECCIVED" should read --RECEIVED--.

In the Claims

Column 15,
Line 15, "acknowledged" should read --acknowledged,--.
Line 16, "device" should read --device,--.
Line 52, "circuitry" should read --circuitry,--.
Line 52, "information" should read --apparatus--.
Line 62, "acknowledged" should read --acknowledged,--.
Line 63, "device" should read --device,--.

Column 16,
Line 36, "vehicle" should read --vehicle,--.
Line 47, "acknowledged" should read --acknowledged,--.
Line 62, "acknowledged" should read --acknowledged,--.
Line 63, "device" should read --device,--.

Signed and Sealed this
Third Day of April, 2018

Andrei Iancu
*Director of the United States Patent and Trademark Office*